(12) United States Patent
Weiss et al.

(10) Patent No.: US 11,697,346 B1
(45) Date of Patent: Jul. 11, 2023

(54) LANE POSITION IN AUGMENTED REALITY HEAD-UP DISPLAY SYSTEM

(71) Applicant: GM Global Technology Operations LLC, Detroit, MI (US)

(72) Inventors: John P. Weiss, Shelby Township, MI (US); Joseph F. Szczerba, Grand Blanc, MI (US); Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/707,239

(22) Filed: Mar. 29, 2022

(51) Int. Cl.
*B60K 35/00* (2006.01)
*G06V 20/56* (2022.01)
(Continued)

(52) U.S. Cl.
CPC .......... *B60K 35/00* (2013.01); *G02B 27/0093* (2013.01); *G02B 27/0101* (2013.01); *G06T 7/50* (2017.01); *G06T 7/73* (2017.01); *G06T 11/001* (2013.01); *G06V 20/588* (2022.01); *G08G 1/096766* (2013.01); *B60K 2370/1529* (2019.05); *B60K 2370/168* (2019.05); *B60K 2370/178* (2019.05); *B60K 2370/179* (2019.05); *B60K 2370/188* (2019.05); *B60K 2370/21* (2019.05); *B60K 2370/52* (2019.05); *B60K 2370/736* (2019.05); *G02B 2027/014* (2013.01); *G02B 2027/0138* (2013.01); *G02B 2027/0141* (2013.01); *G06T 2207/30256* (2013.01)

(58) Field of Classification Search
CPC ............ B60K 35/00; B60K 2370/1529; B60K 2370/168; B60K 2370/178; B60K 2370/736; B60K 2370/188; B60K 2370/52; B60K 2370/21; B60K 2370/179; G06T 7/50; G06T 11/001; G06T 2207/30256; G06T 7/73; G06V 20/588; G02B 27/0093; G02B 27/0101; G02B 2027/0138; G02B 2027/014; G02B 2027/0141; G08G 1/096766
See application file for complete search history.

(56) References Cited

U.S. PATENT DOCUMENTS 11,467,415 B1 * 10/2022 Chang .................... G09G 3/002
2010/0253493 A1 * 10/2010 Szczerba ................ G02B 27/01
345/593

(Continued)

*Primary Examiner* — Christopher E Leiby
(74) *Attorney, Agent, or Firm* — Vivacqua Crane, PLLC

(57) ABSTRACT

A head-up display system for a vehicle includes at least one light source adapted to project an image upon an inner surface of a windshield of the vehicle, a driver monitoring system adapted to track a position of a driver's eyes, at least one non-visual sensor adapted to detect objects within an environment surrounding the vehicle, at least one image capturing device adapted to capture images of the environment surrounding the vehicle, and, a controller in communication with the at least one laser, the at least one non-visual sensor and the at least one image capturing device, the controller adapted to identify lane markers and objects within the environment surrounding the vehicle, determine the position of the vehicle within a lane of a roadway the vehicle is traveling upon, and, display, with the at least one light source, a lane position alert.

16 Claims, 7 Drawing Sheets

(51) Int. Cl.
*G06T 7/73* (2017.01)
*G06T 7/50* (2017.01)
*G06T 11/00* (2006.01)
*G02B 27/00* (2006.01)
*G02B 27/01* (2006.01)
*G08G 1/0967* (2006.01)

(56) References Cited

U.S. PATENT DOCUMENTS

| | | | | |
|---|---|---|---|---|
| 2010/0253598 | A1* | 10/2010 | Szczerba | G08G 1/166 |
| | | | | 701/532 |
| 2011/0301813 | A1* | 12/2011 | Sun | B62D 15/029 |
| | | | | 348/148 |
| 2016/0200249 | A1* | 7/2016 | Boyd | B60Q 9/00 |
| | | | | 340/459 |
| 2017/0031162 | A1* | 2/2017 | Konishi | G02B 30/52 |
| 2017/0253182 | A1* | 9/2017 | Aoki | G01C 21/265 |
| 2018/0023970 | A1* | 1/2018 | Iguchi | G08G 1/096861 |
| | | | | 345/7 |
| 2018/0024354 | A1* | 1/2018 | Shibata | B60W 30/12 |
| | | | | 345/7 |
| 2018/0218611 | A1* | 8/2018 | Nagura | B60Q 3/70 |
| 2019/0191131 | A1* | 6/2019 | Uchida | G02B 27/0977 |
| 2020/0209638 | A1* | 7/2020 | Osmanis | H04N 13/395 |
| 2020/0216062 | A1* | 7/2020 | Hakki | B64C 39/00 |
| 2020/0309555 | A1* | 10/2020 | Kumon | B60K 35/00 |
| 2021/0055548 | A1* | 2/2021 | Rao | G09G 3/3426 |
| 2021/0108926 | A1* | 4/2021 | Tran | G06T 17/05 |
| 2021/0150906 | A1* | 5/2021 | Bang | B62D 15/029 |
| 2021/0237641 | A1* | 8/2021 | Im | B60Q 1/20 |
| 2021/0331588 | A1* | 10/2021 | Sung | B60K 35/00 |
| 2022/0144304 | A1* | 5/2022 | Ehsanibenafati | G01C 21/3811 |
| 2022/0227364 | A1* | 7/2022 | Chase | B60W 50/14 |
| 2022/0334389 | A1* | 10/2022 | Tadauchi | G02B 30/30 |
| 2022/0348217 | A1* | 11/2022 | Jeong | B60W 40/04 |
| 2022/0363251 | A1* | 11/2022 | Shin | B60W 30/12 |
| 2023/0094348 | A1* | 3/2023 | Flotkoetter | B60W 50/14 |
| | | | | 340/435 |

* cited by examiner

LANE POSITION IN AUGMENTED REALITY HEAD-UP DISPLAY SYSTEM

INTRODUCTION

The present disclosure relates to a head-up display and more particularly to a system and method for providing lane position alerts to a driver of a vehicle.

A head-up display (HUD) has become common in modern automobiles. HUDs project useful information like speed and navigation information into the driver's field of view. This avoids forcing the driver to look down, away from the road, to read gages on the dash of the automobile. This reduces driver distractions and keeps the driver's eyes on the road.

Augmented reality (AR) involves enhancing the real world with virtual elements that are shown in three-dimensional space and that permit real-time interaction with users. A head-up display shows information such as, for example, vehicle speed and navigational instructions, directly onto a windscreen of a vehicle, within the driver's forward field of view. Accordingly, the head-up display provides drivers with information without looking away from the road. One possible implementation for augmented reality is an augmented reality head-up display (AR-HUD) for a vehicle. By overlaying images on the windscreen, AR-HUDs enhance a driver's view of the environment outside the vehicle, creating a greater sense of environmental awareness While current augmented reality head-up displays achieve their intended purpose, there is a need for a new and improved system and method of providing lane position alerts to a driver of a vehicle.

SUMMARY

According to several aspects of the present disclosure a method of providing lane position alerts to a driver of a vehicle with a head-up display system includes detecting, with at least one non-visual sensor, objects within an environment surrounding the vehicle, capturing, with at least one image capturing device, images of the environment surrounding the vehicle, tracking, with a driver monitoring system, a position of the driver's eyes, identifying, with a controller in electronic communication with the at least one non-visual sensor and the at least one image capturing device, lane markers and objects within the environment surrounding the vehicle, determining, with the controller, the position of the vehicle within a lane of a roadway the vehicle is traveling upon, and displaying, with at least one light source adapted to project an image upon an inner surface of a windshield of the vehicle and in electronic communication with the controller, a lane position alert.

According to another aspect, the controller is further adapted to continuously identify lane markers and objects within the environment surrounding the vehicle and determine the position of the vehicle within a lane of a roadway the vehicle is traveling upon, the method further including updating the displayed lane position alert when the position of the vehicle in the lane within which the vehicle is traveling changes.

According to another aspect, the determining the position of the vehicle within a lane of a roadway the vehicle is traveling upon, further includes determining a distance between the vehicle and identified lane markers and objects within the environment surrounding the vehicle.

According to another aspect, when the distance between the vehicle and identified lane markers and objects within the environment surrounding the vehicle is less than a pre-determined distance, the displaying a lane position alert further includes displaying a lane position alert including a color-coded graphical lane position alert indicating immediate corrective action by the driver is necessary.

According to another aspect, when the distance between the vehicle and identified lane markers and objects within the environment surrounding the vehicle is greater than the pre-determined distance and decreasing, the displaying a lane position alert further includes displaying a lane position alert including a color-coded graphical lane position alert indicating the vehicle is moving away from an optimal position within the lane.

According to another aspect, the determining the position of the vehicle within a lane of a roadway the vehicle is traveling upon, further includes determining if a driving stability criteria is satisfied.

According to another aspect, when the distance between the vehicle and identified lane markers and objects within the environment surrounding the vehicle is not decreasing, and the distance between the vehicle and identified lane markers and objects within the environment surrounding the vehicle is greater than the pre-determined distance, and the driving stability criteria is not satisfied, the method includes displaying a lane position alert including a color-coded graphical lane position alert indicating erratic driving behavior.

According to another aspect, when the distance between the vehicle and identified lane markers and objects within the environment surrounding the vehicle is not decreasing, and the distance between the vehicle and identified lane markers and objects within the environment surrounding the vehicle is greater than the pre-determined distance, and the driving stability criteria is satisfied, the displaying a lane position alert further includes displaying a lane position alert including a color-coded graphical lane position alert indicating the vehicle is optimally positioned within the lane.

According to another aspect, the system is adapted to be selectively actuated by the operator and to be actuated automatically when the driving stability criteria is not satisfied, the method further including automatically actuating the system when the driving stability criteria is not satisfied.

According to another aspect, the controller includes a wireless communication module and is adapted to receive information from external sources, the method further including receiving, with the wireless communication module within the controller, information from external sources, and displaying a lane position alert indicating conditions of the roadway the vehicle is traveling upon based on information received from the external sources.

According to another aspect, when lane markings are not present, the method includes estimating where lane markings should be with information from the external sources, the at least one non-visual sensor and the at least one image capturing device, and, displaying a lane position alert including lane markings.

According to another aspect, the light source is adapted to project images within a near image plane of the windshield and a far image plane of the windshield, the displaying a lane position alert further including displaying the lane position alert within the far image plane.

According to several aspects of the present disclosure, a head-up display system for an automotive vehicle includes at least one light source adapted to project an image upon an inner surface of a windshield of the vehicle, a driver monitoring system adapted to track a position of a driver's eyes, at least one non-visual sensor adapted to detect objects within an environment surrounding the vehicle, at least one image capturing device adapted to capture images of the environment surrounding the vehicle, a controller in electronic communication with the at least one laser, the at least one non-visual sensor and the at least one image capturing device, the controller adapted to identify, with the at least one non-visual sensor and the at least one image capturing device, lane markers and objects within the environment surrounding the vehicle, determine the position of the vehicle within a lane of a roadway the vehicle is traveling upon, and display, with the at least one light source, a lane position alert.

According to another aspect, the controller is further adapted to continuously identify lane markers and objects within the environment surrounding the vehicle and determine the position of the vehicle in a lane within which the vehicle is traveling, and to update the displayed lane position alert when the position of the vehicle in the lane within which the vehicle is traveling changes.

According to another aspect, when determining the position of the vehicle in the lane within which the vehicle is traveling, the controller is adapted to determine a distance between the vehicle and identified lane markers and objects within the environment surrounding the vehicle, the system adapted to display a lane position alert including a color-coded graphical lane position alert indicating immediate corrective action by the driver is necessary when the distance between the vehicle and identified lane markers and objects within the environment surrounding the vehicle is less than a pre-determined distance, and display a lane position alert including a color-coded graphical lane position alert indicating the vehicle is moving away from an optimal position within the lane when the distance between the vehicle and identified lane markers and objects within the environment surrounding the vehicle is greater than the pre-determined distance and decreasing.

According to another aspect, when determining the position of the vehicle in the lane within which the vehicle is traveling, the controller is adapted to determine if a driving stability criteria is satisfied, the system adapted to display a lane position alert including a color-coded graphical lane position alert indicating erratic driving behavior when the distance between the vehicle and identified lane markers and objects within the environment surrounding the vehicle is not decreasing, and the distance between the vehicle and identified lane markers and objects within the environment surrounding the vehicle is greater than the pre-determined distance the and the driving stability criteria is not satisfied.

According to another aspect, when the distance between the vehicle and identified lane markers and objects within the environment surrounding the vehicle is not decreasing, and the distance between the vehicle and identified lane markers and objects within the environment surrounding the vehicle is greater than the pre-determined distance, and the driving stability criteria is satisfied, the system is adapted to display a lane position alert including a color-coded graphical lane position alert indicating the vehicle is optimally positioned within the lane.

According to another aspect, the system is adapted to be selectively actuated by the operator and to be actuated automatically when the driving stability criteria is not satisfied.

According to another aspect, the controller includes a wireless communication module and is adapted to receive information from external sources, the system further adapted to display a lane position alert indicating conditions of the roadway the vehicle is traveling upon.

According to another aspect, when lane markings are not present, the system, using information from the external sources, the at least one non-visual sensor and the at least one image capturing device, is adapted to estimate where lane markings should be and to display a lane position alert including lane markings.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
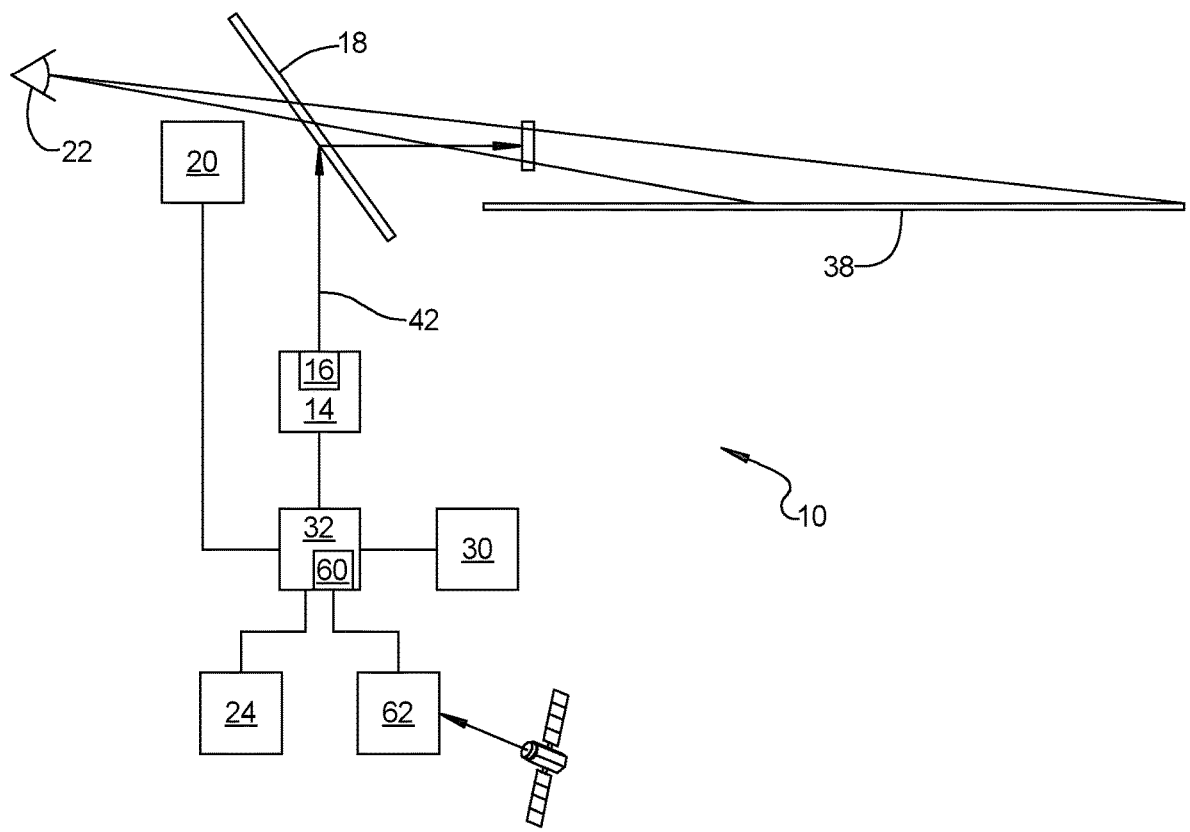
FIG. 1 is a schematic illustration of a head-up display system according to an exemplary embodiment.

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, including autonomous or semi-autonomous vehicles, the technology is not limited to automobiles. The concepts can be used in a wide variety of applications, such as in connection with aircraft, marine craft, other vehicles, and consumer electronic components.

Figure 2:
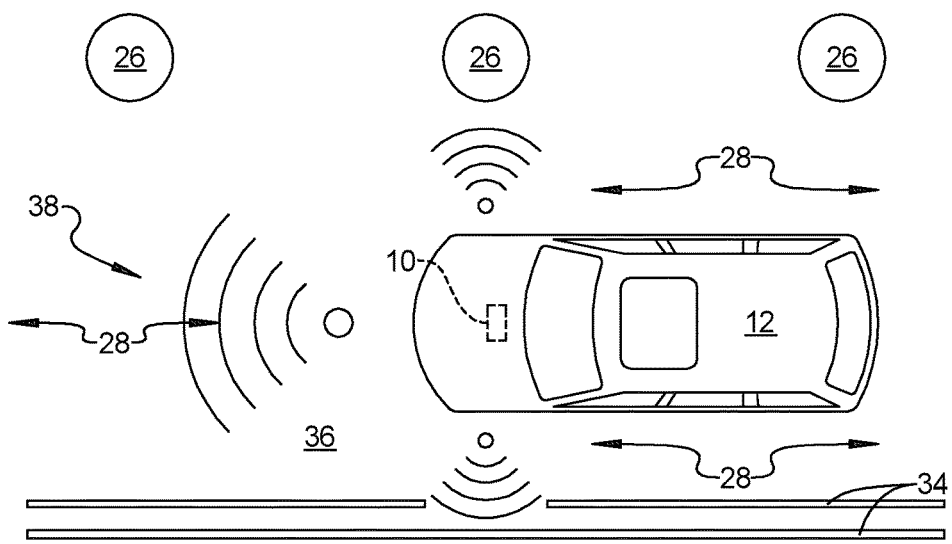
FIG. 2 is a schematic diagram of a vehicle with the system shown in FIG. 1 travelling in a lane on a roadway with lane markings and objects within an environment surrounding the vehicle.

Referring to FIG. 1 and FIG. 2, a head-up display system 10 for an automotive vehicle 12 according to the present disclosure includes a projection module 14 including at least one light source that is adapted to project an image upon an inner surface of a windshield 18 of the vehicle 12. As described herein, the at least one light source comprises a laser 16, however, it should be understood that the at least one light source may be other known types of light sources used in head-up display systems. In an exemplary embodiment, the projection module 14 is a holographic projection module and includes an exit pupil replicator. The holographic image is projected into the exit pupil replicator and then propagates inside the exit pupil replicator and is extracted multiple times before being projected upward to an inner surface of a windshield 18. The re-circulation of the light several times within the exit pupil replicator expands the pupil so the viewer can see the holographic image from an extended eye-box. In addition to expanding the eye-box, the exit pupil replicator also magnifies the original projected image coming out of the laser 16. A spatial light modulator is positioned between the laser 14 and the exit pupil replicator. The spatial light modulator is adapted to receive the light from the laser 16, to diffract the laser light with an encoded hologram and to deliver the diffracted laser to the exit pupil replicator. As shown and described herein, the head-up system is a holographic head-up system, however, it should be understood that the novel features of the present disclosure are applicable to other head-up display configurations.

The system 10 further includes a driver monitoring system 20 that is adapted to track a position of a driver's eyes 22, at least one non-visual sensor 24 that is adapted to detect objects 26 within an environment 28 surrounding the vehicle 12, and at least one image capturing device 30 adapted to capture images of the environment 28 surrounding the vehicle 12, and a controller 32.

The driver monitoring system 20 includes one or more sensors, such as cameras, for determining the location of a head of the driver of the vehicle as well as the orientation or gaze location of the driver's eyes 22. The at least one non-visual sensor 24 includes one or more sensors that are adapted to detect a position, velocity, and direction of travel of objects 26 in the environment 40 surrounding the vehicle 12. By way of non-limiting examples, the at least one non-visual sensor may include one or more sensors such as radar, LiDAR, and infrared sensors, however, it is to be appreciated that other sensors that employ non-visual techniques to detect the presence of objects may be used as well. The at least one image-capturing device 30 may include cameras that obtain periodic or sequential images of the environment 28 surrounding the vehicle 12 and objects 26 therein.

The controller 32 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The controller 32 is in electronic communication with the at least one laser 16, the at least one non-visual sensor 24 and the at least one image capturing device 30. The controller 32 uses the at least one non-visual sensor 24 and the at least one image capturing device 30 to identify lane markers 34 and objects 26 within the environment 28 surrounding the vehicle 12. Lane markers 34 may include, but are not limited to, painted lane markings on the pavement, overhead lights and signage indicating the placement of lanes on the roadway. Objects 26 that may be detected include, but are not limited to, other vehicles, permanent and temporary traffic directing objects, such as barricades, cones, barrels, and guardrails, and foreign objects such as fallen trees, pedestrians, and animals that may be in the roadway.

The controller 32 is further adapted to determine the position of the vehicle 12 within a lane 36 of a roadway 38 the vehicle 12 is traveling upon and to display, with the at least one laser 16, a lane position alert 40. After identifying relevant lane markings 34, the controller 32 determines the position of the vehicle 12 relative to the identified lane markings 34 to determine the vehicle's relative position within the lane 36 it is traveling. Depending on the driving behavior of the vehicle 12 and the position of the vehicle 12 within the lane 36, the controller 32 will display, via the at least one laser 16 of the holographic projection module 14, an appropriate lane position alert 40 to the driver of the vehicle 12.

Figure 3:
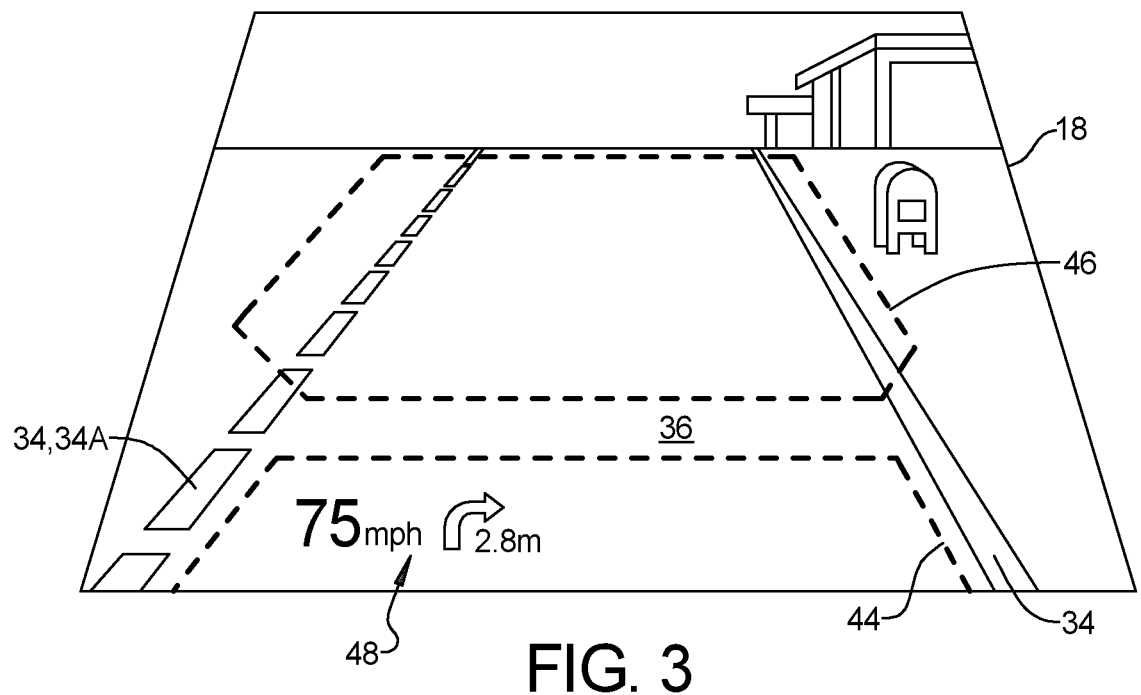
FIG. 3 is a schematic representation of a windshield of a vehicle, wherein the lane of a roadway is visible in front of the vehicle and the HUD system displays cluster information in a near image plane.

Referring again to FIG. 1, the at least one laser 16 of the holographic projection module 14 is adapted to project images upward to the inner surface of the windshield 18 of the vehicle 12, as indicated by arrow 42. Referring to FIG. 3, the laser 16 can project images that will appear to the driver in a near image plane 44, and images that will appear to the driver in a far image plane 46. FIG. 3 is an exemplary interior view of the windshield 18, where the environment 28 surrounding the vehicle 12 is visible through the windshield 18.

The controller 32 instructs the holographic projection module 14 of the augmented reality head-up display system 10 to project cluster content information 48 upon the windshield 18 within the near-field image plane 44. The cluster content information 48 informs the driver of the vehicle 12 of driving conditions such as, but not limited to, vehicle speed, speed limit, gear position, fuel level, current position, and navigational instructions. In the example as shown in FIG. 3, the cluster content information 48 includes vehicle speed and navigational directions. In an exemplary embodiment, the augmented reality head-up display system 10 projects other relevant information upon the windshield 18 within the near image plane 44. Some examples of information displayed in the near plane 44 include a textual indication of the lane position, such as a warning for distracted driving, erratic driving behavior, etc.

The controller 32 instructs the holographic projection module 14 to project the lane position alert 40 upon the windshield 18 within the far image plane 46, where the lane position alert 40 is overlaid at a position upon the windshield 18 where the lane position alert 40 appears to the driver to be positioned on the roadway surface in front of the vehicle 12. The far image plane 46 contains images overlaid upon the roadway 38 that are visible through the windshield 18. In the embodiment as shown in FIG. 3, the far image plane 46 only covers a portion of the entire plane of the windshield 18, however, it is to be appreciated that in another implementation the far image plane 46 may cover the entire plane of the windshield 18 that is not occupied by the near image plane 44. Moreover, although FIG. 3 illustrates the far image plane 46 only spanning across a portion of the lanes 36 that are part of the roadway 38, in embodiments the far image plane 46 spans entirely across each lane 36 across the roadway 38.

In an exemplary embodiment, the controller 32 is further adapted to continuously identify lane markers 34 and objects 26 within the environment 28 surrounding the vehicle 12 and determine the position of the vehicle 12 in a lane 36 within which the vehicle 12 is traveling, and to update the displayed lane position alert 40 when the position of the vehicle 12 in the lane 36 within which the vehicle 12 is traveling changes. The controller 32 continuously repeats this process on a periodic basis, for example, every 0.1 second. Each time the system 10 determines the position of the vehicle 12 within the lane 36, the displayed lane position alert 40 is updated accordingly if the position of the vehicle 12 has changed, or in light of newly identified or changed lane markings 34 and objects 26 within the environment 28 surrounding the vehicle 12.

Figure 4:
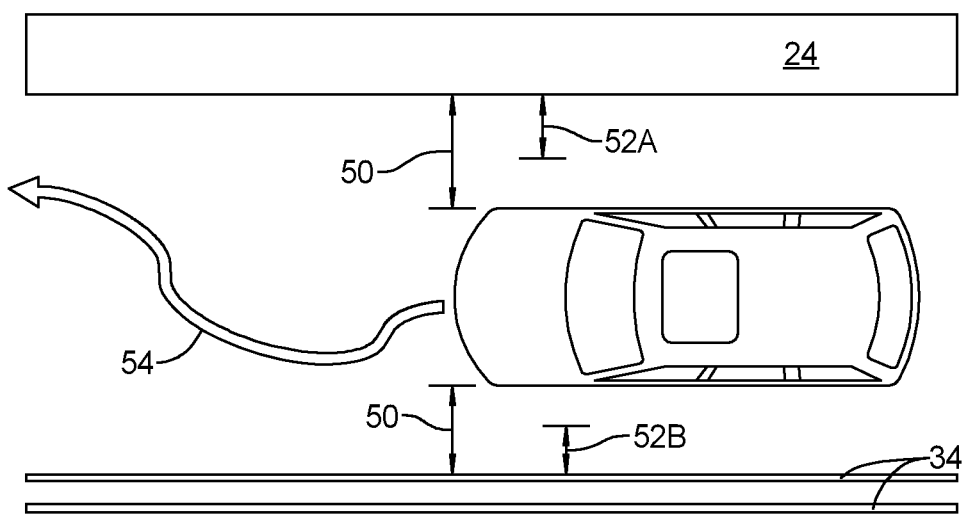
FIG. 4 is a schematic diagram similar to FIG. 2, illustrating the positioning of the vehicle within the lane.

Referring to FIG. 4, when determining the position of the vehicle 12 in the lane 36 within which the vehicle 12 is traveling, the controller 32 is adapted to determine a distance 50 between the vehicle 12 and identified lane markers 34 and objects 26 within the environment 28 surrounding the vehicle 12. The controller 32 is adapted to identify if the distance 50 between the vehicle 12 and identified lane markers 34 and objects 26 within the environment 28 surrounding the vehicle 12 is decreasing, and if the distance between the vehicle 12 and identified lane markers 34 and objects 26 within the environment 28 surrounding the vehicle 12 is less than a pre-determined distance 52A, 52B. The pre-determined distance 52A, 52B is the distance at which the controller 32 determines the vehicle 12 is at an unsafe distance relative to such identified lane markers 34 and objects 26 within the environment 28 surrounding the vehicle 12. For example, the pre-determined distance 52A, 52B may be three feet, wherein, the controller 32 would determine that the vehicle 12 is too close to any object 26 that is within three feet of the vehicle 12. Further, the pre-determined distance may be dependent upon the width of the lane 36 within which the vehicle 12 is traveling. For example, referring to FIG. 4, wherein a vehicle is traveling within a lane 36 defined by lane markers 34 on one side and a concrete barrier 26A on the other side. The controller 32 identifies the lane markings 34 and the concrete barrier 26A and determines the pre-determined distance 52A, 52B that centers the vehicle 12 within the lane 36. The pre-determined distance will depend on the width of the vehicle 12 and the over-all width of the lane 36.

In addition, the pre-determined distance 52A, 52B may depend, partially, on the nature of the lane marking 34 or object 26. Again, referring to FIG. 4, the object 26 on the right of the vehicle is a concrete barrier 26A. The lane markings 34 on the left side of the vehicle are painted on the surface of the roadway 38. The concrete barrier 26A presents an immovable, unforgivable barrier. If the vehicle 12 comes to close to the concrete barrier 26A, damage to the vehicle 12 may result. The painted lane markings 34 on the left side of the vehicle 12 do not present any physical barrier to the vehicle 12. The controller 32 may determine that the pre-determined distance 52A between the vehicle 12 and the concrete barrier 26A should be larger than the pre-determined distance 52B between the vehicle 12 and the painted lane markings 34, thus making the optimal placement of the vehicle 12 on the lane 36 off centered.

Such determinations may also depend on the nature of the roadway 38 and what is happening on the other side of the lane markings. Referring again to the example described above in FIG. 4. Even though the painted lane markings 34 to the left of the vehicle 12 do not present a physical barrier, as does the concrete barrier 26A, immediately on the other side of the lane markings 34, there may be high speed traffic traveling in the opposite direction. Such traffic would pose at least as much risk as the concrete barrier 26A, and thus, the controller 32 may determine that the pre-determined distance 52A between the vehicle 12 and the concrete barrier 26A should be equal to the pre-determined distance 52B between the vehicle 12 and the painted lane markings 34, thus making the optimal placement of the vehicle 12 on the lane 36 centered. Alternatively, immediately on the other side of the lane markings 34, there may be a turning lane, posing much less risk than high speed traffic traveling in the opposite direction. In such circumstance, the controller 32 may again determine that the pre-determined distance 52A between the vehicle 12 and the concrete barrier 26A should be larger than the pre-determined distance 52B between the vehicle 12 and the painted lane markings 34, thus making the optimal placement of the vehicle 12 on the lane 36 off centered.

Ultimately, the controller 32 will determine what the optimal placement of the vehicle 12 within the lane 36 is based on many surrounding factors, such as, but not limited to, the nature of the lane markings 34 and objects 26 identified in the environment 28 surrounding the vehicle 12, weather, traffic conditions (heavy, light, presence of accidents, etc.), speed that the vehicle 12 is travelling, day or night, and nature of the traffic activity in adjacent lanes.

The controller 32 is also adapted to identify if driving stability criteria are being satisfied by the vehicle 12. If driving stability criteria are being satisfied, the vehicle 12 is traveling at an optimal position within the lane 36, and is maintaining that optimal position consistently. For example, referring again to FIG. 4, if the vehicle 12 is swerving back and forth within the lane 36, as indicated at 54, the driving stability criteria is not satisfied.

Figure 5:
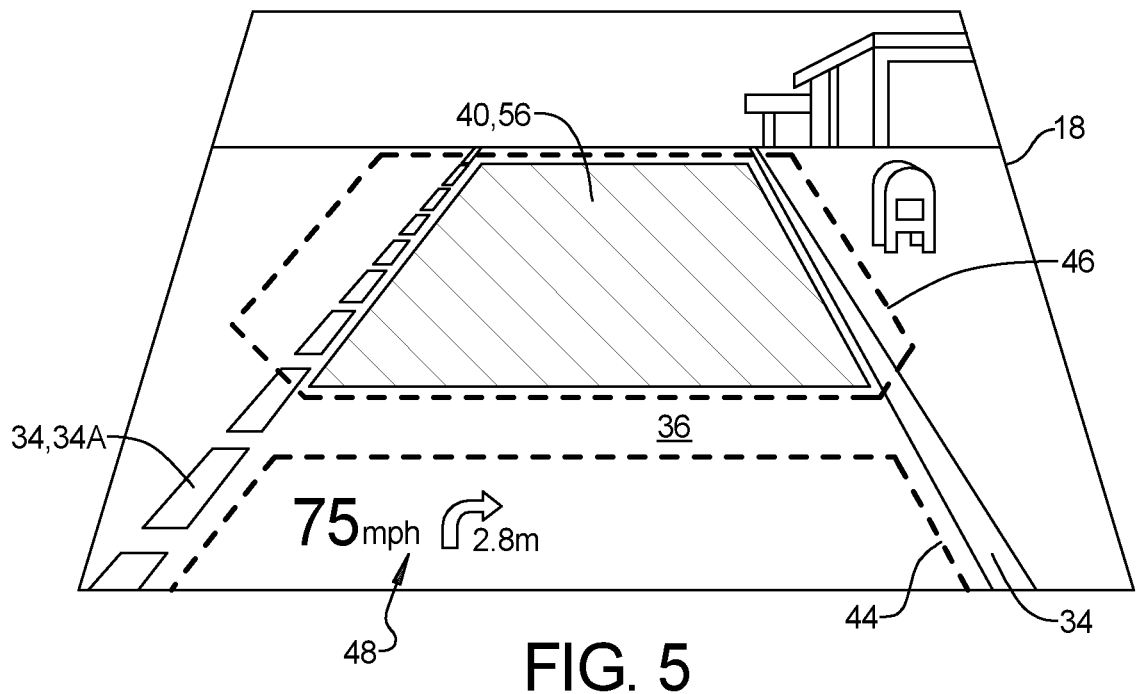
FIG. 5 is a schematic representation of a windshield similar to FIG. 3, wherein the HUD system displays a lane position alert including a first shaded area displayed in a far image plane.

In an exemplary embodiment, when the distance 50 between the vehicle 12 and identified lane markers 34 and objects 26 within the environment 28 surrounding the vehicle 12 is not decreasing, and the distance 50 between the vehicle 12 and identified lane markers 34 and objects 26 within the environment 28 surrounding the vehicle 12 is greater than the pre-determined distance 52A, 52B, and the driving stability criteria is satisfied, the system 10 is adapted to display a lane position alert 40 including a color-coded graphical lane position alert indicating the vehicle 12 is optimally positioned within the lane. Referring to FIG. 5, in an exemplary embodiment, the lane position alert 40 is displayed in the far image plane 46 and includes a first shaded area 56 that substantially fills the lane 36 traveled in within the far image plane 46, and is centered within the lane 36. The color of the displayed lane position alert 40 is meant to convey to the driver that the vehicle 12 is optimally positioned within the lane 36, such as green or blue.

Figure 6:
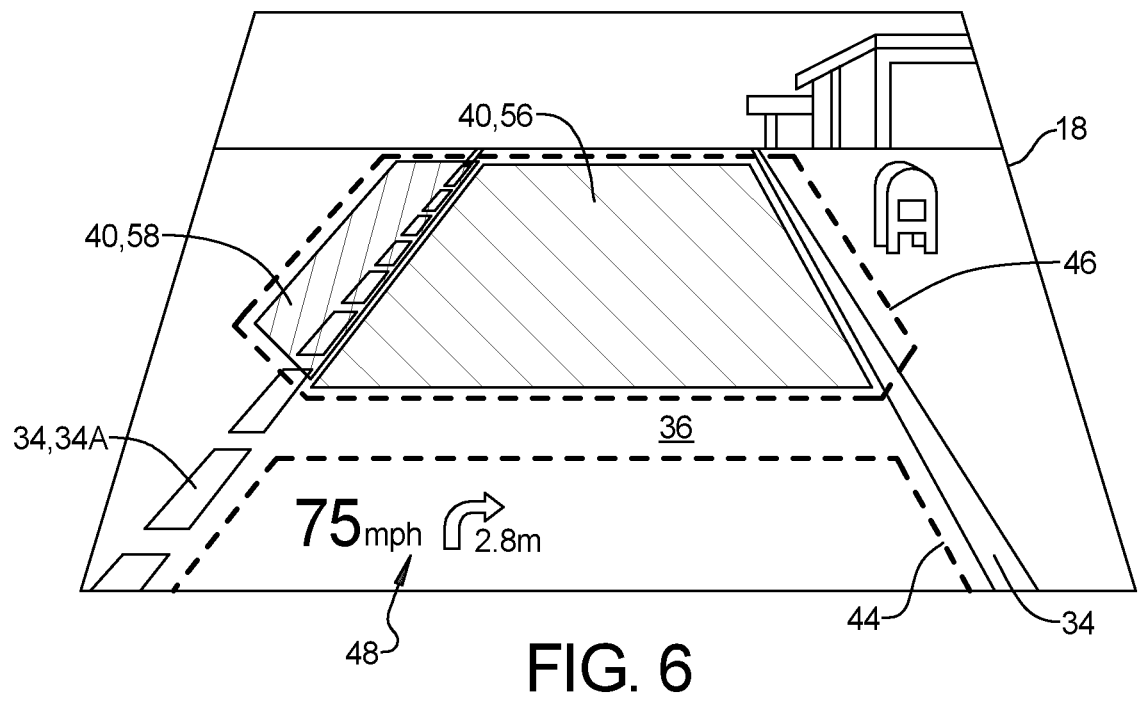
FIG. 6 is a schematic representation of a windshield similar to FIG. 3, wherein the HUD system displays a lane position alert including a first shaded area and a second shaded area displayed in a far image plane.

Referring to FIG. 6, in an exemplary embodiment, when the distance 50 between the vehicle 12 and identified lane markers 34 and objects 26 within the environment 28 surrounding the vehicle 12 is greater than the pre-determined distance 52A, 52B, but, is decreasing, the system will display a lane position alert 40 including a color-coded graphical lane position alert indicating the vehicle 12 is moving away from an optimal position within the lane 36. As shown, the lane position alert 40 includes a first shaded area 56 that substantially fills the lane 36 traveled in within the far-field plane 46, and is centered within the lane 36. The color of the first shaded area 56 will remain a color that is meant to convey to the driver that the vehicle 12 is properly positioned within the lane 36, such as green or blue. The lane position alert 40 also includes a second shaded area 58 that appears adjacent the first shaded area 56 within the far image plane 46.

The second shaded area 58 appears when the controller 32 detects that the distance 50 between the vehicle 12 and identified lane markers 34 and objects 26 within the environment 28 surrounding the vehicle 12 is decreasing, and appears adjacent the first shaded area 56 on a side toward which the vehicle 12 is moving. As shown in FIG. 6, the vehicle 12 is still positioned within the lane 36, but is drifting to the left, toward the center lane 34A of the roadway 38. The second shaded area 58 appears adjacent to the first shaded area 56 on the left to notify the driver that the vehicle 12 is drifting to the left. The second shaded area 58 is a different color than the first shaded area 56 to emphasis the message being conveyed. In an exemplary embodiment, the second shaded area 58 is yellow.

When the controller 32 first detects the vehicle 12 is moving toward the center line 34A, the second shaded area 58 appears. In an exemplary embodiment, if the vehicle 12 continues to move toward the center line 34A, the second shaded area 58 will become larger, and continue to get larger if the vehicle 12 continues to drift toward the center line 34A. The color intensity of the second shaded area may also change. For example, if the vehicle 12 continues to move toward the center line 34A, the second shaded area 58 will become a brighter shade of yellow, and continue to get brighter if the vehicle 12 continues to drift toward the center line 34A.

Figure 7:
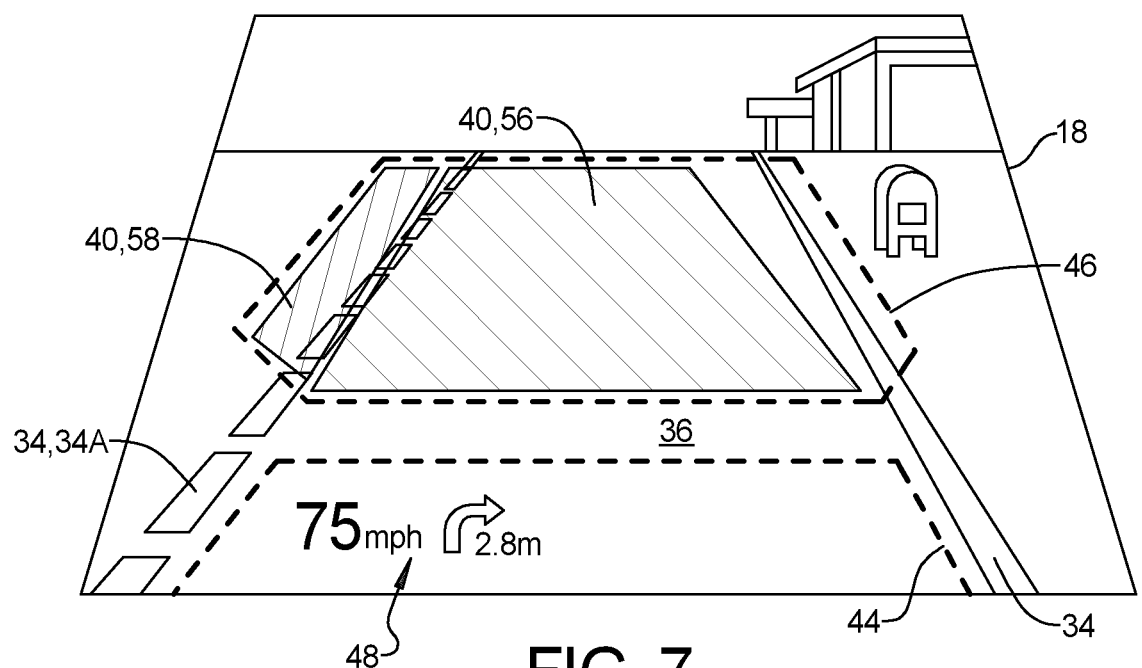
FIG. 7 is a schematic representation of a windshield similar to FIG. 6, wherein the HUD system displays a lane position alert including a first shaded area and a second shaded area displayed in a far image plane and angled toward a center line of the roadway.
Figure 8:
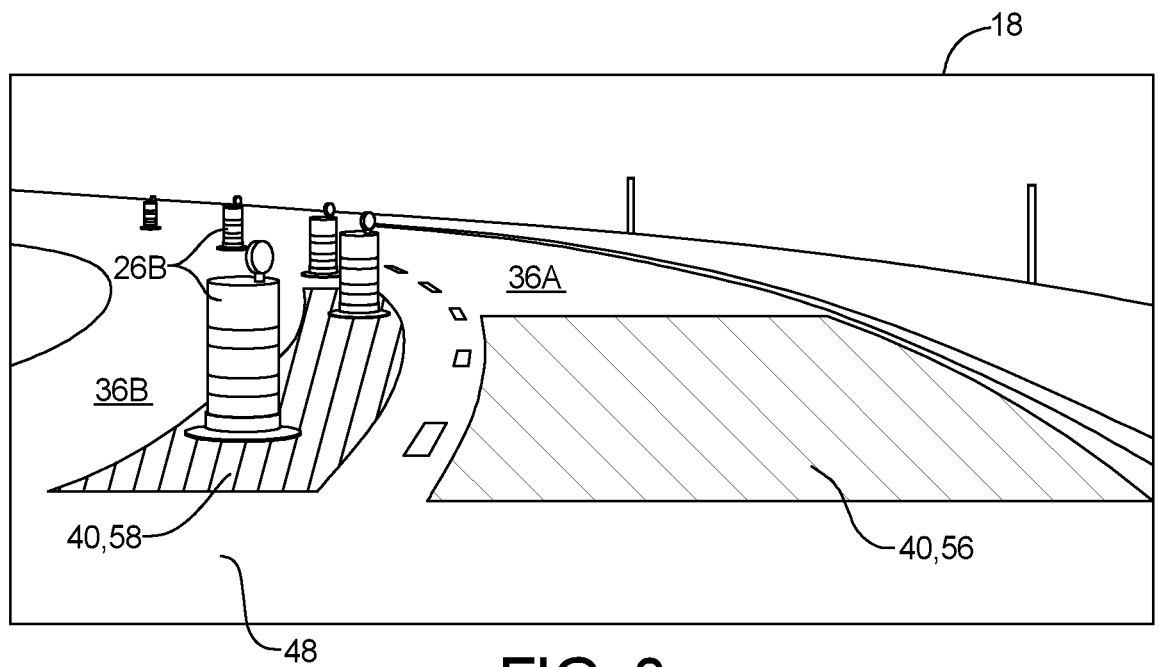
FIG. 8 is a schematic representation of a windshield similar to FIG. 6, wherein the HUD system displays a lane position alert including a first shaded area and a second shaded area displayed in a far image plane, wherein the second shaded area highlights physical traffic barriers for the driver of the vehicle.

Referring to FIG. 7, in an exemplary embodiment, when the distance 50 between the vehicle 12 and identified lane markers 34 and objects 26 within the environment 28 surrounding the vehicle 12 is less than the pre-determined distance 52A, 52B, the system 10 will display a lane position alert 40 including a color-coded graphical lane position alert indicating immediate corrective action by the driver is necessary.

When this occurs, the color of the first and second shaded areas 56, 58 changes to indicate to the driver that the vehicle 12 is at an unsafe distance from surrounding objects 26 and lane markers 34. For example, the color of the first and second shaded areas 56, 58 would change to red. In an exemplary embodiment, the position of the first and second shaded areas 56, 58 of the lane position alert 40 also change, emphasizing the message to the driver of the vehicle 12 that corrective action should be taken. As shown in FIG. 7, the controller 32 detects that the vehicle 12 is drifting toward the center line 34A of the roadway 38, and is less than the pre-determined distance 52A, 52B from the center line 34A. The position of the first and second shaded areas 56, 58 changes by angling toward the center line 34A to indicate to the driver that the vehicle 12 is drifting toward the center line 34A, and the color of the first and second shaded areas changes to red.

If the vehicle 12 remains less than the pre-determined distance 52A, 52B from the center line 34A, the first and second shaded areas 56, 58 will transition to a brighter shade of red, and continue to get brighter if the vehicle 12 remains less than the pre-determined distance 52A, 52B from the center line 34A. In other exemplary embodiments, the first and second shaded areas 56, 58 may exhibit animated characteristics, such as fading or pulsing, to better gain the attention of the driver and emphasis the message that corrective action should be taken. Further, if the vehicle 12 is equipped with automatic lane assist features, the lane position alert 40 may include animation characteristics indicating to the driver that the vehicle 12 is automatically steering itself back to an optimal position within the lane 36.

In another exemplary embodiment, if the controller 32 determines that driving stability criteria is not satisfied, the system 10 is adapted to display a lane position alert 40 including a color-coded graphical lane position alert indicating erratic driving behavior. Referring again to FIG. 6, the system 10 will display first and second shaded areas 56, 58 within the far-field plane 46 even when the distance 50 between the vehicle 12 and identified lane markers 34 and objects 26 within the environment 28 surrounding the vehicle 12 is not decreasing and greater than the pre-determined distance 52A, 52B if the system 10 determines that the behavior of the vehicle 12 does not satisfy driving stability criteria.

For example, if the vehicle 12 is maintaining position within the lane 36, and not coming within the pre-determined distance 52A, 52B of any identified lane markers 34 or objects 26 in proximity to the vehicle 12, but the vehicle 12 has been swerving back and forth, as indicated at 54 in FIG. 4. the system 10 will display the first shaded area 56, and second shaded areas 58 on either or both sides of the first shaded area 56 to alert the driver, resulting in the driver paying closer attention and driving less erratically. If the driving behavior is mildly erratic, the system 10 may display the first and second shaded areas 56, 58 of the lane position alert 40 in yellow, with increasing brightness if the erratic driving continues, and if the driving behavior is severely erratic, the system 10 may display the first and second shaded areas 56, 58 of the lane position alert 40 in red, with increasing brightness and animation characteristics if the behavior is not corrected.

In an exemplary embodiment, the system 10 is adapted to be selectively actuated by the driver and to be actuated automatically when the driving stability criteria is not satisfied. Thus, the driver of the vehicle 12 may decide not to actuate the system 10, so the system 10 will not display lane position alerts 40, however, if the system 10, running in the background, determines that the vehicle 12 is being driven erratically, the system 10 may automatically display appropriate lane position alerts 40 to the driver of the vehicle 12.

In other embodiments, the system 10 may be adapted to automatically actuate under pre-determined or user customized preferences. For example, the system 10 may automatically actuate when weather conditions deteriorate, when the vehicle 12 approaches an accident scene or construction zone, if the driver monitoring system 20 detects distracted driving, or during night-time driving.

Referring to FIG. 7, in another exemplary embodiment, the system 10 is adapted to detect the presence of physical traffic barriers 26B and to provide a lane position alert 40 indicating the presence of such physical traffic barriers 26B. As shown, the vehicle 12 is being driven within the lane 36, at the optimal position, so the system 10 displays a lane position alert 40 including the first shaded area 56, displayed in a neutral color, such as blue or green, to indicate to the driver that the vehicle 12 is currently properly positioned within the lane 36A. However, the system 10 has also detected the presence of physical traffic barriers 26B in the adjacent lane 36B, which otherwise would be available to the vehicle 12 for use. To emphasis the presence of such physical traffic barriers 26B to the driver, the system 10 displays a second shaded area 58A overlaying the adjacent lane 36B and color-coded red, to emphasis the presence of the physical traffic barriers 26B to the driver.

Referring again to FIG. 1, the controller 32 includes a wireless communication module 60 that is adapted to allow wireless communication between the vehicle 12 and other vehicles or other external sources. The controller 32 is adapted to collect information from databases via a wireless data communication network 62 over wireless communication channels such as a WLAN, 4G/LTE or 5G network, or the like. Such databases can be communicated with directly via the internet, or may be cloud-based databases. Information that may be collected by the controller 32 from such external sources includes, but is not limited to road and highway databases maintained by the department of transportation, a global positioning system, the internet, other vehicles via V2V communication networks, traffic information sources, vehicle-based support systems such as OnStar, etc. The controller 32 is adapted, via the wireless communication module 60, to receive information from external sources, and to display a lane position alert 40 indicating conditions of the roadway 38 the vehicle 12 is traveling upon.

Figure 9:
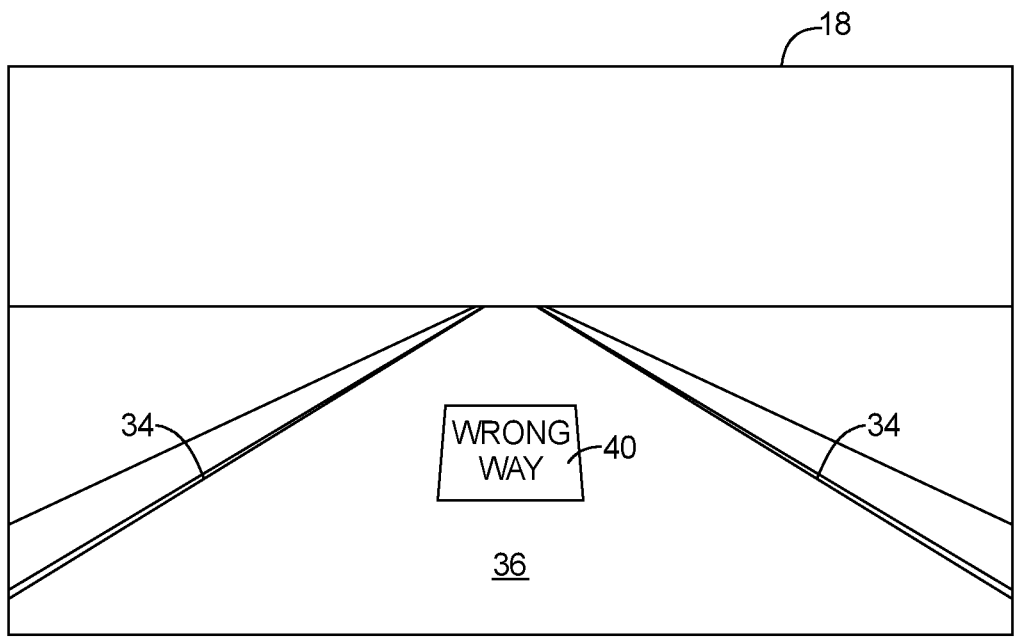
FIG. 9 is a schematic representation of a windshield similar to FIG. 6, wherein the HUD system displays a lane position alert including a graphic message displayed in a far-field plane informing the driver that the vehicle is travelling the wrong way on a one-way street.
Figure 10:
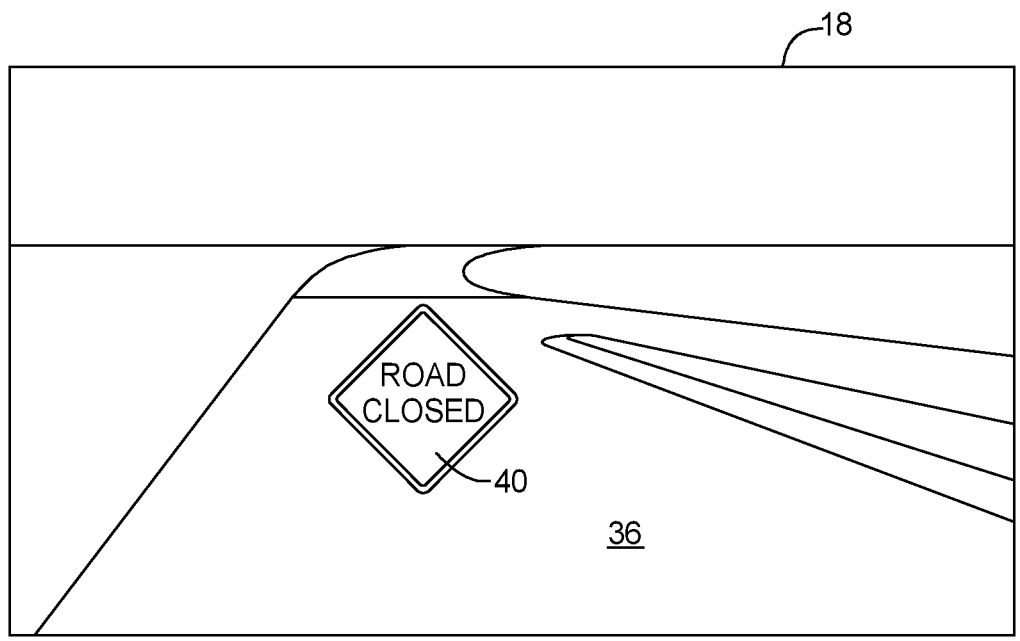
FIG. 10 is a schematic representation of a windshield similar to FIG. 6, wherein the HUD system displays a lane position alert including a graphic message displayed in a far-field plane informing the driver that the vehicle is travelling on a roadway that is closed.

In an exemplary embodiment, the system 10 may receive information from external sources that the vehicle 12 is traveling the wrong way on a one-way street and provide a lane position alert 40 in the far-field plane 46 informing the driver that they are going the wrong way, as shown in FIG. 9, or the system 10 may receive information from external sources that the vehicle 12 is traveling on a roadway 38 that is closed for construction, and provide a lane position alert 40 in the far field plane 46 informing the driver that the road is closed, as shown in FIG. 10. This provides added information to the driver that may be crucial if the driver failed to see relevant signage, or if proper signage/barriers have been damaged or are not present. In another exemplary embodiment, the system 10 may receive information from external sources, such as GPS, traffic databases, or V2V communication, that traffic patterns have been deviated for an accident or construction. In such instances, the system will terminate lane position alerts 40 that are based on existing lane markings. Alternatively, the driver of the vehicle 12, upon recognizing an upcoming traffic deviation, can dismiss displayed lane position alerts 40 manually or with a verbal command.

Figure 11:
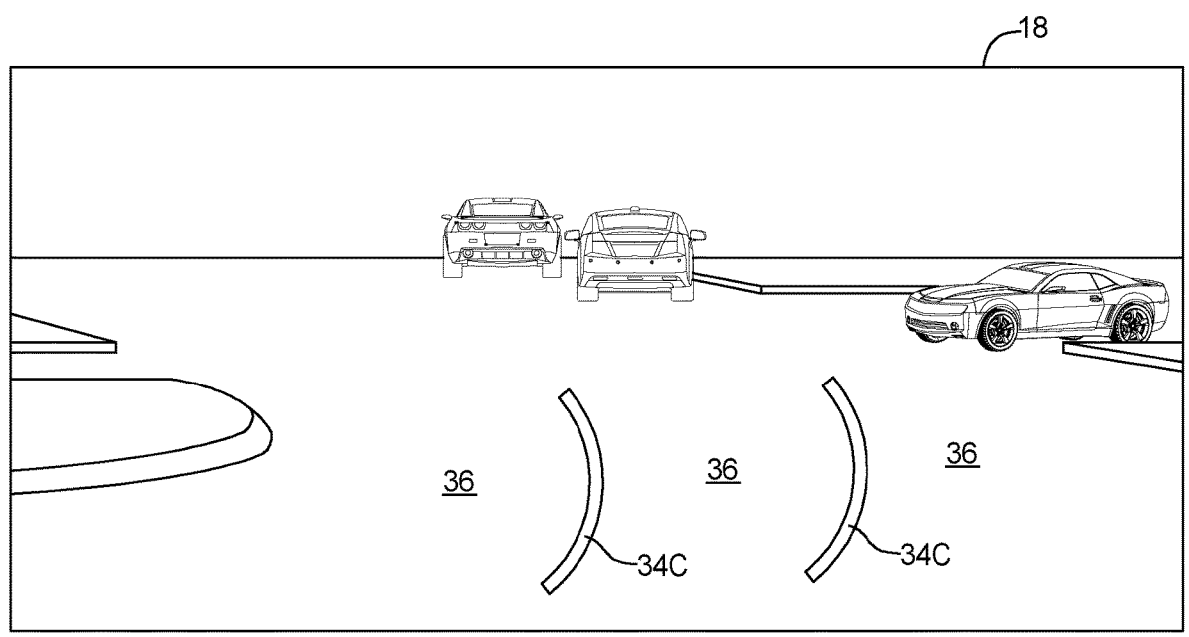
FIG. 11 is a schematic representation of a windshield similar to FIG. 6, wherein the HUD system displays a lane position alert including a graphic message displayed in a far image plane including lane markings.
Figure 12:
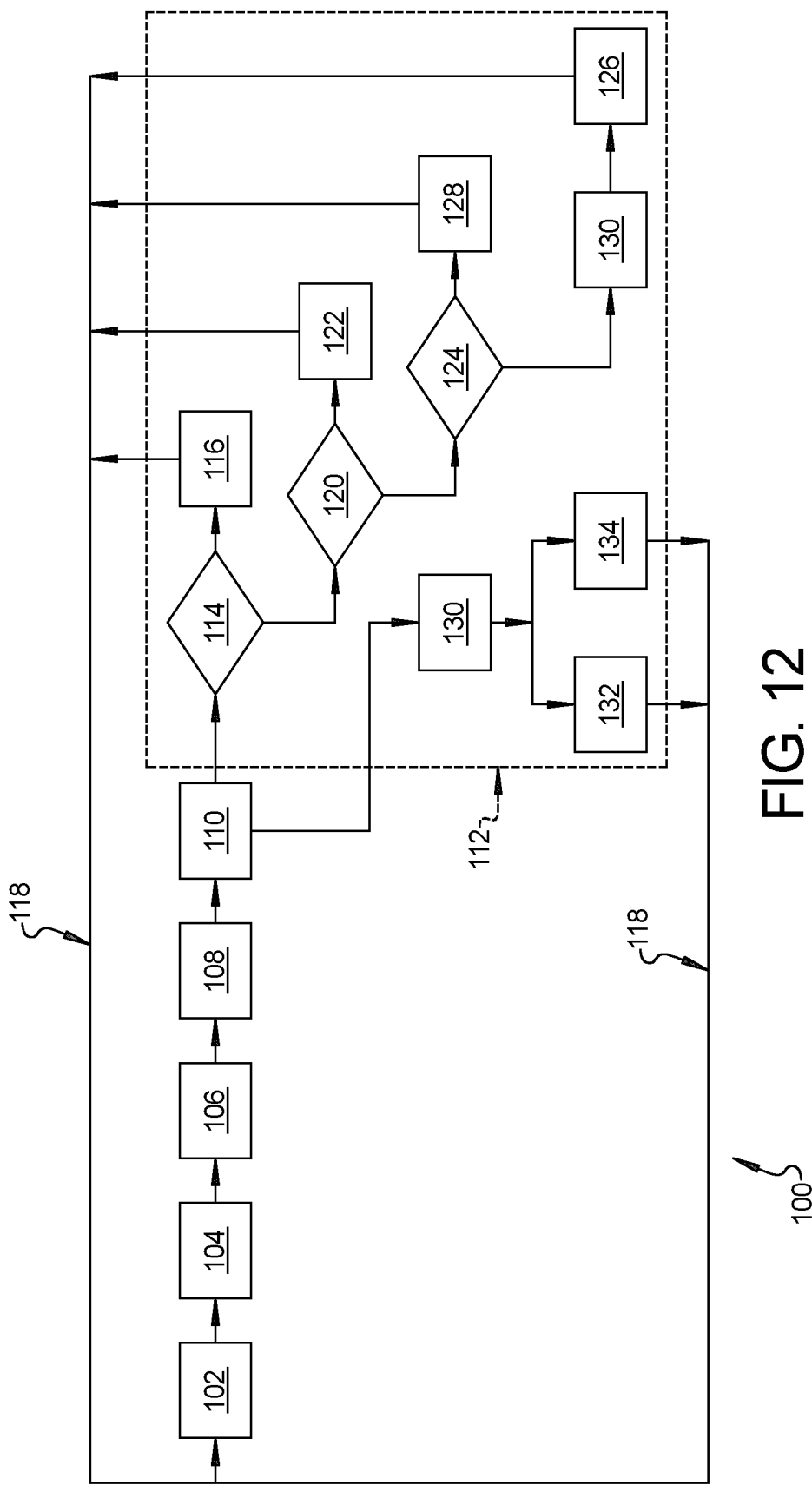
FIG. 12 is a schematic flowchart illustrating a method according to an exemplary embodiment of the present disclosure.

Referring to FIG. 11, in another exemplary embodiment, when lane markings 34 are not present, the system 10, using information from the external sources, the at least one non-visual sensor 24 and the at least one image capturing device 30, is adapted to estimate where lane markings 34 should be and to display a lane position alert 40 including lane markings 34C. As shown in FIG. 11, the roadway 38 is meant to accommodate three lanes 36 of turning traffic, but the roadway 38 does not include lane markers 34 making this clear to vehicles. The system 10 uses relevant information gathered by the vehicle sensors and cameras, and information from external sources to estimate the proper location of three lanes 36, and provide a lane position alert 40 that include lane markings 34C.

The system 10 obtains information of the position of the eyes 22 of a driver of the vehicle 12 from a camera of the driver monitoring system 20 within the vehicle 12. The driver monitoring system 20 uses the camera to identify the facial features of the driver and provides information on the vertical location of the eyes 22 of the driver to the controller 32. The laser 16 of the holographic projection module 14 is adapted to project an image upward to the windshield 18 within the vehicle 12. The projected image reflects from an inner surface of the windshield 18 to an eye-box. The eye-box is the three-dimensional region within which a driver of the vehicle 12 can see the entire projected image from the HUD system. The look down angle (LDA) is the angle at which the eyes 22 of a driver are oriented relative to the virtual image projected to the eyes 22 of the driver. The virtual image distance (VID) is the distance from the driver's eyes the virtual image is perceived by the driver. To accommodate for driver's of different heights, the LDA and the VID are adjustable to ensure the image projected by the holographic projection module 14 is perceived at the proper location by all drivers.

The controller 32 is adapted to determine the distance that the vertical location of the driver's eyes 22 varies from the pre-determined nominal vertical position. Based on the distance at which the driver's eyes 22 are either higher or lower than the nominal vertical position, the holographic projection module 14 can adjust the LDA of the holographic image projected by the laser 16 to properly position the displayed lane position alert 40 for the driver of the vehicle 12.

Referring to FIG. 11, a method 100 of providing lane position alerts 40 to a driver of a vehicle 12 with a head-up system 10 includes, beginning at block 102, detecting, with at least one non-visual sensor 24, objects 26 within an environment 28 surrounding the vehicle 12, moving to block 104, capturing, with at least one image capturing device 30, images of the environment 28 surrounding the vehicle 12, moving to block 106, tracking, with a driver monitoring system 20, a position of the driver's eyes 22, moving to block 108, identifying, with a controller 32 in electronic communication with the at least one non-visual sensor 24 and the at least one image capturing device 30, lane markers 34 and objects 26 within the environment 28 surrounding the vehicle 12, moving to block 110, determining, with the controller 32, the position of the vehicle 12 within a lane 36 of a roadway 38 the vehicle 12 is traveling upon; and moving to block 112, displaying, with at least one laser 16 of a holographic projection module adapted to project a holographic image upon an inner surface of a windshield 18 of the vehicle 12 and in electronic communication with the controller 32, a lane position alert 40.

In an exemplary embodiment, the laser 16 is adapted to project holographic images within a near image plane 44 of the windshield 18 and a far image plane 46 of the windshield 18, and, the displaying a lane position alert 40 at block 112 further includes displaying the lane position alert 40 within the far image plane 46.

In an exemplary embodiment, controller 32 is further adapted to continuously identify lane markers 34 and objects 26 within the environment 28 surrounding the vehicle 12 and determine the position of the vehicle 12 within a lane 36 of a roadway 38 the vehicle is traveling upon, the method 100 further including updating the displayed lane position alert 40 when the position of the vehicle 12 in the lane 36 within which the vehicle 12 is traveling changes by periodically repeating the steps described in blocks 102, 104, 106, 108, 110 and 112, as indicated by lines 118.

In an exemplary embodiment, the determining the position of the vehicle 12 within a lane 36 of a roadway 38 the vehicle 12 is traveling upon at block 110, further includes determining a distance 50 between the vehicle 12 and identified lane markers 34 and objects 26 within the environment 28 surrounding the vehicle 12. Moving to block 114, when the distance 50 between the vehicle 12 and identified lane markers 34 and objects 26 within the environment 28 surrounding the vehicle 12 is less than a pre-determined distance 52A, 52B, moving to block 116, the displaying a lane position alert 40 further includes displaying a lane position alert 40 including a color-coded graphical lane position alert indicating immediate corrective action by the driver is necessary.

Moving again to block 114, when the distance 50 between the vehicle 12 and identified lane markers 34 and objects 26 within the environment 28 surrounding the vehicle 12 is greater than the pre-determined distance 52A, 52B, moving to block 120, and the distance 50 between the vehicle 12 and identified lane markers 34 and objects 26 within the environment 28 surrounding the vehicle 12 is decreasing, moving to block 122, the displaying a lane position alert 40 further includes displaying a lane position alert 40 including a color-coded graphical lane position alert indicating the vehicle 12 is moving away from an optimal position within the lane 36.

In another exemplary embodiment, the determining the position of the vehicle 12 within a lane 36 of a roadway 38 the vehicle 12 is traveling upon at block 110, further includes determining if a driving stability criteria is satisfied. Moving again to block 114, when the distance 50 between the vehicle 12 and identified lane markers 34 and objects 26 within the environment 28 surrounding the vehicle 12 is greater than the pre-determined distance 52A, 52B, and, moving to block 120, the distance 50 between the vehicle 12 and identified lane markers 34 and objects 26 within the environment 28 surrounding the vehicle 12 is not decreasing, and, moving to block 124, the driving stability criteria is not satisfied, then, moving to block 126, the method 100 includes displaying a lane position alert 40 including a color-coded graphical lane position alert 40 indicating erratic driving behavior.

In another exemplary embodiment, moving again to block 114, when the distance 50 between the vehicle 12 and identified lane markers 34 and objects 26 within the environment 28 surrounding the vehicle 12 is greater than the pre-determined distance 52A, 52B, and, moving to block 120, the distance 50 between the vehicle 12 and identified lane markers 34 and objects 26 within the environment 28 surrounding the vehicle 12 is not decreasing, and, moving to block 124, the driving stability criteria is satisfied, then, moving to block 128, the displaying a lane position alert 40 further includes displaying a lane position alert 40 including a color-coded graphical lane position alert indicating the vehicle 12 is optimally positioned within the lane 36.

In an exemplary embodiment, the system 10 is adapted to be selectively actuated by the operator and to be actuated automatically when the driving stability criteria is not satisfied, the method 100 further including, moving to block 130, automatically actuating the system 10 when the driving stability criteria is not satisfied at block 124.

In another exemplary embodiment, the controller 32 includes a wireless communication module 60 and is adapted to receive information from external sources, the method 100 further including, after the determining the position of the vehicle 12 within a lane 36 of a roadway 38 the vehicle 12 is traveling upon at block 110, moving to block 130, receiving, with the wireless communication module 60 within the controller 32, information from external sources, and, moving to block 132, displaying a lane position alert 40 indicating conditions of the roadway 38 the vehicle 12 is traveling upon based on information received from the external sources, as shown in FIG. 9 and FIG. 10.

In another exemplary embodiment, after receiving, with the wireless communication module 60 within the controller 32, information from external sources at block 130, moving to block 134, when lane markings 34 are not present, the method 100 includes estimating where lane markings 34 should be with information from the external sources, the at least one non-visual sensor 24 and the at least one image capturing device 30, and, displaying a lane position alert 40 including lane markings 34C.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing lane position alerts to a driver of a vehicle with a head-up display system, comprising:
   detecting, with at least one non-visual sensor, objects within an environment surrounding the vehicle;
   capturing, with at least one image capturing device, images of the environment surrounding the vehicle;
   tracking, with a drive monitoring system, a position of the driver's eyes;
   identifying, with a controller in electronic communication with the at least one non-visual sensor and the at least one image capturing device, lane markers and objects within the environment surrounding the vehicle;
   determining, with the controller, the position of the vehicle within a lane of a roadway the vehicle is traveling upon, and determining a distance between the vehicle and identified lane markers and objects within the environment surrounding the vehicle; and
   displaying, with a laser of a holographic projection module adapted to project an image upon an inner surface of a windshield of the vehicle and in electronic communication with the controller, a lane position alert including a first shaded area that substantially fills and is centered within the lane traveled in within a far image plane and a second shaded area positioned adjacent the first shaded area within the far image plane, wherein the lane position alert appears to the driver to be positioned on the roadway surface in front of the vehicle;

wherein when the distance between the vehicle and identified lane markers and objects within the environment surrounding the vehicle is less than the pre-determined distance, the displaying a lane position alert further includes displaying a lane position alert within the first shaded area including a color-coded graphical lane position alert indicating immediate corrective action by the driver is necessary; and wherein, when the distance between the vehicle and identified lane markers and objects within the environment surrounding the vehicle is greater than a pre-determined distance and decreasing, the displaying a lane position alert further includes displaying a lane position alert within the second shaded area including a color-coded graphical lane position alert indicating the vehicle is moving away from an optimal position within the lane.

2. The method of claim 1, wherein, the controller is further adapted to continuously identify lane markers and objects within the environment surrounding the vehicle and determine the position of the vehicle within a lane of a roadway the vehicle is traveling upon, the method further including updating the displayed lane position alert when the position of the vehicle in the lane within which the vehicle is traveling changes.

3. The method of claim 2, wherein the determining the position of the vehicle within a lane of a roadway the vehicle is traveling upon, further includes detecting repeated swerving of the vehicle back and forth within the lane, wherein the vehicle does not swerve within the pre-determined distance of lane markers and objects within the environment surrounding the vehicle, and determining that driving stability criteria is not satisfied when swerving of the vehicle back and forth within the lane, wherein the vehicle does not swerve within the pre-determined distance of lane markers and objects within the environment surrounding the vehicle is occurring.

4. The method of claim 3, wherein, when the distance between the vehicle and identified lane markers and objects within the environment surrounding the vehicle is not decreasing, and the distance between the vehicle and identified lane markers and objects within the environment surrounding the vehicle is greater than the pre-determined distance, and the driving stability criteria is not satisfied, the method includes displaying a lane position alert including a color-coded graphical lane position alert within the first shaded area and the second shaded area indicating erratic driving behavior.

5. The method of claim 4, wherein when the distance between the vehicle and identified lane markers and objects within the environment surrounding the vehicle is not decreasing, and the distance between the vehicle and identified lane markers and objects within the environment surrounding the vehicle is greater than the pre-determined distance, and repeated swerving of the vehicle back and forth within the lane, wherein the vehicle does not swerve within the pre-determined distance of lane markers and objects within the environment surrounding the vehicle has not been detected, the displaying a lane position alert further includes displaying a lane position alert including a color-coded graphical lane position alert within the first shaded area indicating the vehicle is optimally positioned within the lane.

6. The method of claim 5, wherein the system is adapted to be selectively actuated by the operator and to be actuated automatically when the driving stability criteria is not satisfied, the method further including automatically actuating the system when the driving stability criteria is not satisfied.

7. The method of claim 6, wherein the controller includes a wireless communication module and is adapted to receive information from external sources, the method further including:

receiving, with the wireless communication module within the controller, information from external sources; and displaying a lane position alert indicating conditions of the roadway the vehicle is traveling upon within the first shaded area based on information received from the external sources.

8. A head-up display system for an automotive vehicle, comprising:

at least one light source adapted to project an image upon an inner surface of a windshield of the vehicle, the at least one light source including a laser of a holographic projection module;

a driver monitoring system adapted to track a position of a driver's eyes;

at least one non-visual sensor adapted to detect objects within an environment surrounding the vehicle;

at least one image capturing device adapted to capture images of the environment surrounding the vehicle;

a controller in electronic communication with the laser of the holographic projection module, the at least one non-visual sensor and the at least one image capturing device, the controller adapted to:

identify, with the at least one non-visual sensor and the at least one image capturing device, lane markers and objects within the environment surrounding the vehicle;

determine the position of the vehicle within a lane of a roadway the vehicle is traveling upon;

determine a distance between the vehicle and identified lane markers and objects within the environment surrounding the vehicle;

display, with the laser of the holographic projection module, a lane position alert including a first shaded area that substantially fills and is centered within the lane traveled in within a far image plane and a second shaded area positioned adjacent the first shaded area within the far image plane, wherein the lane position alert appears to the driver to be positioned on the roadway surface in front of the vehicle;

display a lane position alert including a color-coded graphical lane position alert within the first shaded area indicating immediate corrective action by the driver is necessary when the distance between the vehicle and identified lane markers and objects within the environment surrounding the vehicle is less than a pre-determined distance; and display a lane position alert including a color-coded graphical lane position alert within the second shaded area indicating the vehicle is moving away from an optimal position within the lane when the distance between the vehicle and identified lane markers and objects within the environment surrounding the vehicle is greater than the pre-determined distance and decreasing.

9. The system of claim 8, wherein, the controller is further adapted to continuously identify lane markers and objects within the environment surrounding the vehicle and determine the position of the vehicle in a lane within which the vehicle is traveling, and to update the displayed lane position alert when the position of the vehicle in the lane within which the vehicle is traveling changes.

10. The system of claim 9, wherein, the controller is further adapted to detect repeated swerving of the vehicle back and forth within the lane, wherein the vehicle does not swerve within the pre-determined distance of lane markers and objects within the environment surrounding the vehicle, and to determine that driving stability criteria is not satisfied when swerving of the vehicle back and forth within the lane, wherein the vehicle does not swerve within the pre-determined distance of lane markers and objects within the environment surrounding the vehicle is occurring, the system adapted to display a lane position alert including a color-coded graphical lane position alert within the first shaded area and the second shaded area indicating erratic driving behavior when the distance between the vehicle and identified lane markers and objects within the environment surrounding the vehicle is not decreasing, and the distance between the vehicle and identified lane markers and objects within the environment surrounding the vehicle is greater than the pre-determined distance the and the driving stability criteria is not satisfied.

11. The system of claim 10, wherein when the distance between the vehicle and identified lane markers and objects within the environment surrounding the vehicle is not decreasing, and the distance between the vehicle and identified lane markers and objects within the environment surrounding the vehicle is greater than the pre-determined distance, and the controller has not detected repeated swerving of the vehicle back and forth within the lane, wherein the vehicle does not swerve within the pre-determined distance of lane markers and objects within the environment surrounding the vehicle, the system is adapted to display a lane position alert including a color-coded graphical lane position alert within the first shaded area indicating the vehicle is optimally positioned within the lane.

12. The system of claim 11, wherein the system is adapted to be selectively actuated by the operator and to be actuated automatically when the driving stability criteria is not satisfied.

13. The system of claim 12, wherein the controller includes a wireless communication module and is adapted to receive information from external sources, the system further adapted to display a lane position alert within the first shaded area indicating conditions of the roadway the vehicle is traveling upon.

14. The system of claim 13, wherein when lane markings are not present, the system, using information from the external sources, the at least one non-visual sensor and the at least one image capturing device, is adapted to estimate where lane markings should be and to display a lane position alert including lane markings.

15. The system of claim 9, wherein, after the controller displays the lane position alert including a color-coded graphical lane position alert within the second shaded area indicating the vehicle is moving away from an optimal position within the lane when the distance between the vehicle and identified lane markers and objects within the environment surrounding the vehicle is greater than the pre-determined distance and decreasing, the controller is further adapted to:
   change the displayed lane position alert within the second shaded area when the distance between the vehicle and identified lane markers and objects within the environment surrounding the vehicle remain greater than the pre-determined distance and continue to decrease.

16. The system of claim 15, wherein the controller is adapted to change the displayed lane position alert within the second shaded area by at least one of changing the color of the displayed lane position alert, changing the brightness of the lane position alert, and increasing the size of the second shaded area.

\* \* \* \* \*